US006734438B1

(12) United States Patent
Lindsay et al.

(10) Patent No.: US 6,734,438 B1
(45) Date of Patent: May 11, 2004

(54) SCANNING PROBE MICROSCOPE AND SOLENOID DRIVEN CANTILEVER ASSEMBLY

(75) Inventors: Stuart Martin Lindsay, Phoenix, AZ (US); Tianwei Jing, Tempe, AZ (US)

(73) Assignees: Molecular Imaging Corporation, Phoenix, AZ (US); Arizona Board of Regents, Tempe, AZ (US)

( * ) Notice: Subject to any disclaimer, the term of this patent is extended or adjusted under 35 U.S.C. 154(b) by 190 days.

(21) Appl. No.: 09/882,465

(22) Filed: Jun. 14, 2001

(51) Int. Cl.⁷ ............................................... H01J 37/20
(52) U.S. Cl. ................................................. 250/442.11
(58) Field of Search ............................ 250/442.11, 307; 250/306

(56) References Cited

U.S. PATENT DOCUMENTS

| | | |
|---|---|---|
| 5,495,109 A | 2/1996 | Lindsay et al. |
| 5,581,082 A | 12/1996 | Hansma et al. |
| 5,630,932 A | 5/1997 | Lindsay et al. |
| 5,670,712 A * | 9/1997 | Cleveland et al. ............ 73/105 |
| 5,672,816 A * | 9/1997 | Park et al. ..................... 73/105 |
| 5,675,154 A | 10/1997 | Lindsay et al. |
| 5,705,814 A * | 1/1998 | Young et al. ................ 250/306 |
| 5,750,989 A | 5/1998 | Lindsay et al. |
| 5,753,814 A | 5/1998 | Han et al. |
| 5,760,396 A | 6/1998 | Lindsay et al. |
| 5,805,448 A | 9/1998 | Lindsay et al. |
| 5,821,545 A | 10/1998 | Lindsay et al. |
| 5,866,805 A | 2/1999 | Han et al. |
| 5,948,972 A * | 9/1999 | Samsavar et al. ............. 73/105 |
| 5,983,712 A | 11/1999 | Lindsay et al. |
| 6,017,590 A | 1/2000 | Lindsay et al. |
| 6,051,825 A | 4/2000 | Lindsay et al. |
| 6,121,611 A | 9/2000 | Lindsay et al. |
| 6,134,955 A | 10/2000 | Han et al. |
| 6,265,718 B1 * | 7/2001 | Park et al. .................... 250/307 |

OTHER PUBLICATIONS

Putman et al., "Atomic Force Microscopy Combined with Confocal Laser Scanning Microscopy: A New Look at Cells" Bioimaging I, (1993), pp. 63–70.
Neagu et al., "Analysis of Immunolabeled Cells by Atomic Force Microscopy, Optical Microscopy, and Flow Cytometry" Journal of Structural Biology, (1994) pp. 32–40.
Schabert et al., "Confocal Scanning Laser—Scanning Probe Hybrid Microscope for Biological Applications", Ultramicroscopy 53 (1994) pp. 147–157.
Han et al., "A Magnetically Driven Oscillating Probe Microscope for Operation in Liquids" Appl. Phys. Lett., vol. 69, No. 26, Dec. 23, 1996 pp. 4111–4113.
Henderson et al., "Imaging F–Actin in Fixed Glial Cells with a Combined Optical Fluorescence/Atomic Force Microscope" Neuroimage 1, (1993) pp. 145–150.
Shimon Weiss, "Fluorescence Spectroscopy of Single Biomolecules" Single Molecules Mar. 12, 1999 pp. 1676–1683.

* cited by examiner

*Primary Examiner*—John R. Lee
*Assistant Examiner*—Johnnie L Smith, II
(74) *Attorney, Agent, or Firm*—Dinsmore and Shohl LLP

(57) ABSTRACT

A combined scanning probe and optical microscope is provided. The microscope comprises a sample stage, a scanning probe microscope, an optical microscope, a microscope coupling, and a sample stage support. The microscope coupling, the sample stage, and the sample stage support are arranged to inhibit relative motion between the sample stage and the scanning probe microscope in the event of simultaneous low frequency vibrations in the optical microscope and high frequency vibrations in the scanning probe microscope. In accordance with other embodiments of the present invention scanning probe microscopes are provided comprising a slide-mounted stage assembly, a solenoid unit positioned above the cantilever unit of the probe, and a specialized solenoid driven cantilever assembly.

54 Claims, 4 Drawing Sheets

SCANNING PROBE MICROSCOPE AND SOLENOID DRIVEN CANTILEVER ASSEMBLY

STATEMENT REGARDING FEDERALLY SPONSORED RESEARCH OR DEVELOPMENT

This invention was made with government support under Contract No. BIR 9513233 awarded by the National Science Foundation. The Government has certain rights in this invention.

BACKGROUND OF THE INVENTION

The present invention relates to scanning probe microscopy, and in particular to the construction of a combination scanning probe and optical microscope for use in atomic force microscopy.

High quality optical views of a sample under investigation by a scanning probe microscope maybe obtained by combining the scanning probe microscope with an optical microscope. The optical view may be used, for example, to view gross features on the sample and track the position of the scanning probe with respect to the gross features. In this manner, the scanning probe may be conveniently maneuvered to particular areas of interest on the sample. The optical view may also be used to monitor processes optically as the scanning probe touches or manipulates molecules on the sample. A variety of combined scanning probe and optical microscope arrangements have been proposed. However, the presence of the optical microscope assembly tends to degrade the scanning probe performance because the optical microscope assemblies used tend to be relatively massive and, as such, tend to transfer significant low frequency resonant vibrational frequencies to the sample stage. As a result, the sample stage undergoes significant vibrational displacement, directly degrading the scanning probe analysis. Accordingly, there remains a need in the art for a combined scanning probe and optical microscope which is less prone to low frequency vibration than the designs of the prior art.

Another challenge associated with the design and operation of combined scanning probe and optical microscopes is presented in the context of magnetically induced oscillation of the scanning probe. Solenoids are commonly used in this art to induce oscillation in the scanning probe. Locating the solenoid for optimum probe displacement and control has traditionally been problematic. Accordingly, there exists a further need in the art for a scanning probe microscope design where a solenoid may be arranged in an optimum configuration.

Still another challenge associated with the design and operation of combined scanning probe and optical microscopes is presented in the context of sample placement, removal, and replacement. Typically, where an optical microscope is combined with a scanning probe microscope, the resulting design is cumbersome in that it is difficult to place, remove, and replace samples. Accordingly, there exists a further need in the art for a scanning probe microscope design that provides for convenient sample placement, removal, and replacement.

BRIEF SUMMARY OF THE INVENTION

These needs are met by the present invention wherein, in accordance with one embodiment of the present invention, a combined scanning probe and optical microscope is provided. The microscope comprises a sample stage, a scanning probe microscope, an optical microscope, a microscope coupling, and a sample stage support. The sample stage defines an upper surface and a lower surface. The scanning probe microscope is configured to examine a surface of a sample supported by the upper surface of the sample stage from above the sample stage. The optical microscope is configured to examine a sample supported by the upper surface of the sample stage from below the sample stage. The microscope coupling mechanically couples elements of the scanning probe microscope to elements of the optical microscope. The sample stage support is configured to isolate the sample stage from the optical microscope. The sample stage, the scanning probe microscope, and the sample stage support define relatively high frequency mechanical resonances. The optical microscope defines relatively low frequency mechanical resonances. The microscope coupling, the sample stage, and the sample stage support are arranged to inhibit differential motion between the sample stage and the scanning probe microscope in the event of low frequency vibrations in the optical microscope.

The combined scanning probe and optical microscope is preferably designed such that a critical path coupling low frequency vibrations generated in the optical microscope to a sample supported by the sample stage runs from the optical microscope, through the microscope coupling, the sample stage support, and, finally, the sample stage. The sample stage support and the sample stage are preferably designed such that the critical path is not conducive to low frequency vibrational coupling. The scanning probe microscope, the optical microscope, and the microscope coupling may define a microscope chassis and the sample stage support may be configured to function as the sole significant source of vibro-mechanical coupling between the sample stage and the microscope chassis.

In accordance with another embodiment of the present invention, a scanning probe microscope is provided comprising a sample stage, a scanning probe microscope, a microscope coupling, a sample stage support, and a slide-mounted stage assembly supported by a microscope chassis. The scanning probe microscope is configured to examine a surface of the sample. The microscope coupling supports elements of the scanning probe microscope. The sample stage support is configured to suspend the sample stage from the microscope coupling. The slide-mounted stage assembly is arranged to permit slidable movement of the sample stage and the sample stage support relative to the microscope chassis.

In accordance with yet another embodiment of the present invention, a scanning probe microscope is provided comprising a sample stage, a scanning probe microscope configured to examine a surface of a sample supported by the sample stage, a microscope coupling, and a sample stage support configured to suspend the sample stage from the microscope coupling. The scanning probe microscope includes a solenoid driven cantilever assembly comprising a cantilever unit, a probe tip, and a solenoid unit. The cantilever unit is positioned above the sample stage and comprises a flexible cantilever having a free end and a confined end. The probe tip is defined at the free end of the flexible cantilever. A solenoid unit is positioned above the cantilever unit and comprises a magnetic core and a solenoid winding. The solenoid unit is configured to cause movement of the free end of the flexible cantilever.

In accordance with yet another embodiment of the present invention, a solenoid driven cantilever assembly is provided comprising a cantilever unit, a probe tip, and a solenoid unit. The cantilever unit comprises a flexible cantilever having a free end and a confined end. The probe tip is defined at the free end of the flexible cantilever and defines an apex on a lower side of the cantilever unit. A solenoid unit is positioned above the cantilever unit and comprises a magnetic core and a solenoid winding. The solenoid unit is configured to cause movement of the free end of the flexible cantilever.

Accordingly, it is an object of the present invention to provide a combined scanning probe and optical microscope which is less prone to low frequency vibration than the designs of the prior art, a scanning probe microscope design where a solenoid may be arranged in an optimum configuration, and a scanning probe microscope design that provides for convenient sample placement, removal, and replacement. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
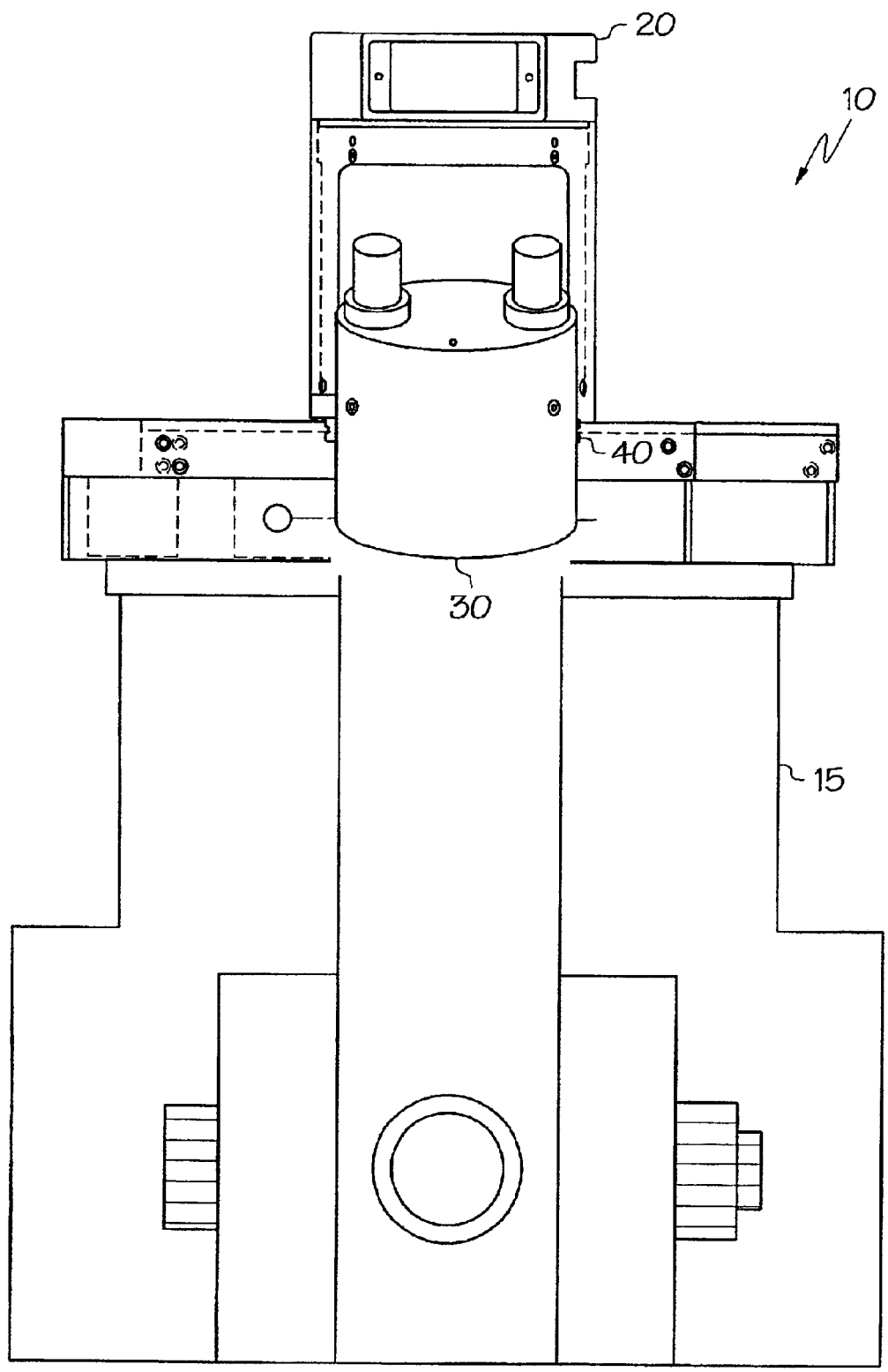
FIG. 1 is an illustration of a combined scanning probe and optical microscope according to one embodiment of the present invention.

A combined scanning probe and optical microscope 10 according to the present invention is described herein with collective reference to FIGS. 1–4. The microscope 10 generally includes a scanning probe microscope 20, an optical microscope 30, a microscope coupling 40, a sample stage 50, and a sample stage support 60.

The sample stage 50 defines an upper surface 52 and a lower surface 54. A sample (not shown) is placed upon the upper surface 52 for examination and may, optionally, be positioned within a fluid crucible 56 and submerged in a body of fluid to enhance examination by the scanning probe microscope 20. The particular manner in which the scanning probe microscope 20 is employed to examine the sample is not the subject of the present invention and may be gleaned from related teachings present in any one of a number of U.S. Patents, including U.S. Pat. Nos. 6,134,955, 6,133,955, 6,121,611, 5,983,712, 5,866,805, 5,805,448, 5,760,396, 5,753,814, 5,750,989, 5,675,154, 5,581,082, 5,495,109, the disclosures of which are incorporated herein by reference. For example, the position of the scanning probe microscope 20 may be adjusted by means of micrometer screws (not shown) which translate the scanning probe microscope 20 over the surface of the sample under examination.

Figure 2:
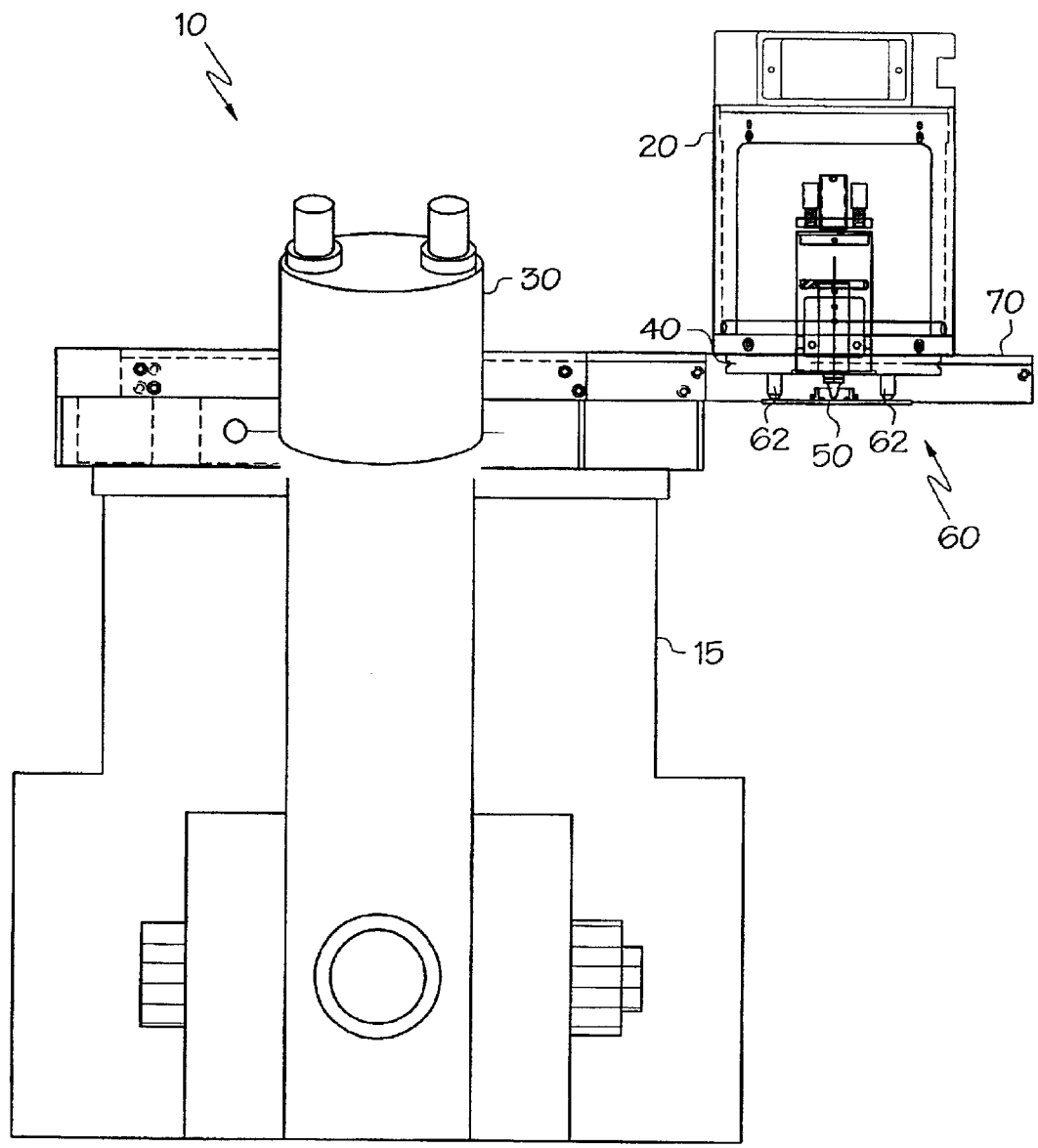
FIG. 2 is an illustration of the combined scanning probe and optical microscope of FIG. 1 showing the scanning probe portion of the microscope in a slide-out configuration.
Figure 3:
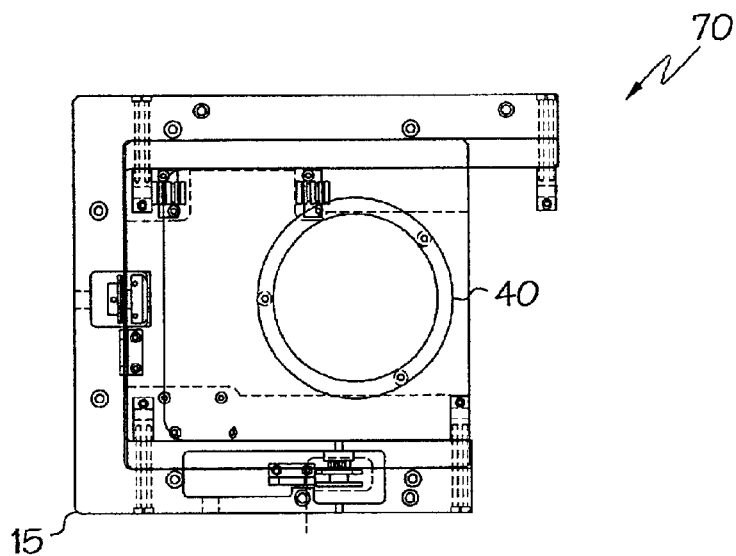
FIG. 3 is an illustration of a slide-out mechanism for use in the microscope of the present invention.
Figure 4:
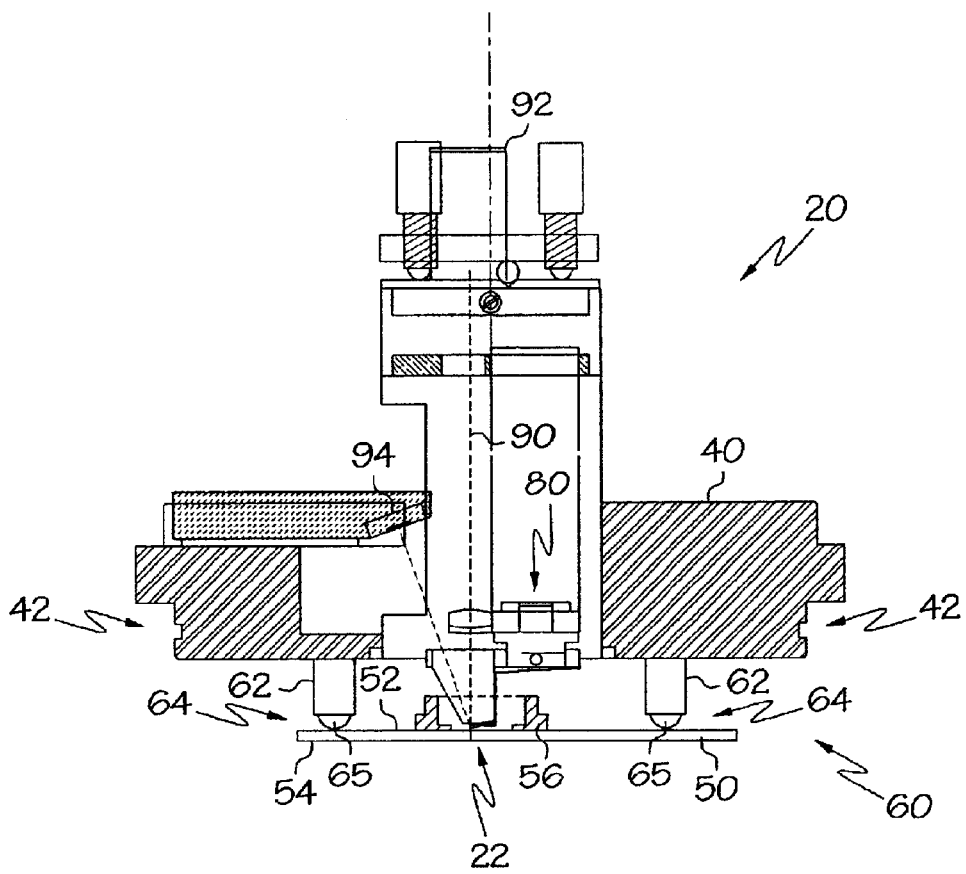
FIG. 4 is an illustration of a sample stage, scanning probe microscope, microscope coupling, and sample stage support according to the present invention.
Figure 5:
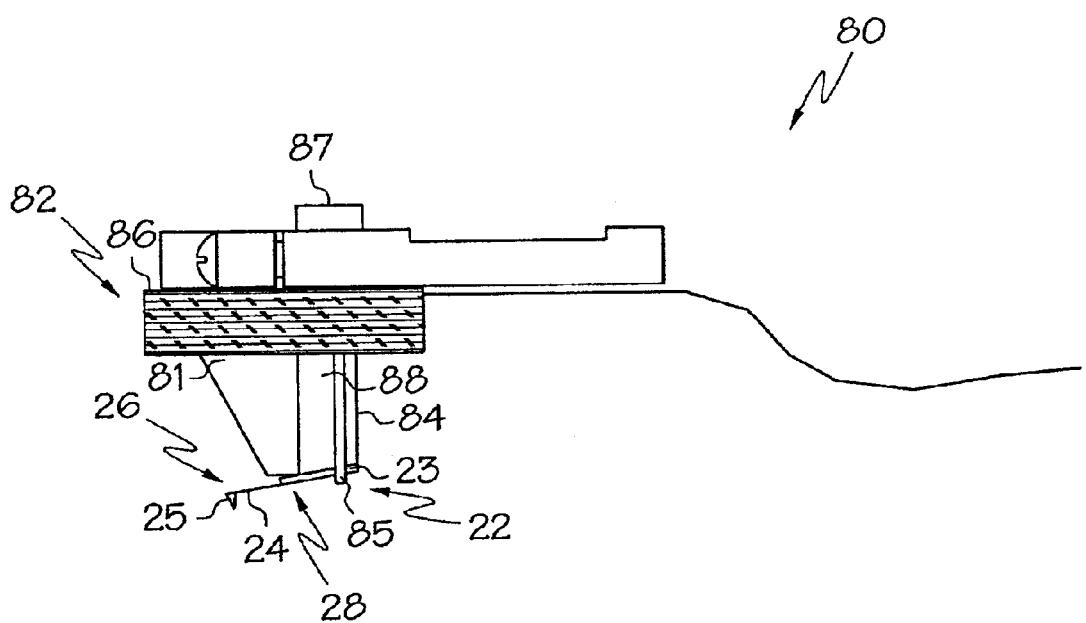
FIG. 5 is an illustration of a solenoid driven cantilever assembly according to the present invention

For the purposes of defining and describing the present invention, with the exception of the embodiment of the present invention illustrated in FIG. 5, it will be sufficient to note that the scanning probe microscope 20 is supported by a microscope chassis 15 and includes a cantilever unit 22 positioned above the sample stage 50 and comprising a flexible cantilever 24 having a free end 26 and a confined end 28. A probe tip 25 is defined at the free end 26 of the flexible cantilever 24 (see FIG. 5). Accordingly, as is illustrated in FIGS. 1, 2, and 4, the scanning probe microscope 20 is configured to examine a sample supported by the upper surface 52 of the sample stage 50 from above the sample stage 50. The optical microscope 30 includes an optical objective below the sample stage 50 focused through a transparent sample stage 50, or through an aperture or window in the sample stage 50, onto the region of the sample scanned by the scanning probe microscope 20. As such, the optical microscope 30 may be used to examine the sample from below the sample stage 50. As is illustrated in FIGS. 2 and 4, the microscope coupling 40 mechanically couples elements of the scanning probe microscope 20 to elements of the optical microscope 30.

The optical microscope 30 is typically a massive object and, as such, is subject to relatively low frequency mechanical resonances. In contrast, the scanning probe microscope 20 is typically subject to relatively high frequency mechanical resonances. According to the arrangement of the present invention, the microscope coupling 40, the sample stage 50, and the sample stage support 60 are arranged such that the presence of the low frequency vibrations in the optical microscope 30 do not excite differential motion between the scanning probe microscope probe 20 and the sample stage 50 because of high frequency vibrations associated with the scanning probe microscope probe 20 and the sample stage 50. Further, the high frequency vibrations in the scanning probe microscope 20 do not create relative motion between the sample stage 50 and the scanning probe microscope 20.

Specifically, it is important to note that the sample stage 50 is not the microscope stage of the optical microscope 30 and, as such, is not part of the optical microscope 30. Rather, the sample stage support 60 supports or suspends the sample stage 50 at distal ends 62 of a plurality of suspension members 64 extending from the microscope coupling 40 and, as such, isolates the sample stage 50 from the optical microscope 30 and the microscope coupling 40. As is clearly illustrated in FIG. 4, the sample stage 50 is suspended from below said microscope coupling 40 while engaged with said coupling at points of contact defined at the distal ends 62 of the suspension members 64. The critical path coupling any low frequency vibrations generated in the optical microscope to a sample under examination runs from the optical microscope 30, through the microscope coupling 40, the sample stage support 60, and the sample stage 50, to the sample. The scanning probe microscope 20, the optical microscope 30, and the microscope coupling 40 define a microscope chassis 15 and the sample stage support 60 is configured to function as the sole significant source of vibro-mechanical coupling between the sample stage 50 and the microscope chassis. For the purposes of defining and describing the present invention, it is noted that a significant source of vibro-mechanical coupling comprises any source of coupling that would lead to detectable performance degradation of the combined microscope.

The sample stage support 60 and the sample stage 50 are designed such that the critical path is not conducive to low frequency vibrational coupling. Specifically, in order to make the resonant frequency of the sample stage 50 significantly higher than that of the optical microscope 30, the suspension members 64 extending from the microscope coupling 40 should be configured to define a minimum bending moment, i.e., they should be as short as practical and have a diameter that is as large as practical. For example, and not by way of limitation, the suspension members 64 are preferably no more than 1 cm in length and no less than 0.5 cm in diameter. It is contemplated that other dimensional combinations will also be suitable for practicing the present invention. For the purposes of defining and describing the present invention, it is noted that low frequency vibrations or mechanical resonances are in the range of about 0.1 Hz to about 100 Hz. High frequency vibrations or mechanical resonances are well above 100 Hz.

The sample stage 50 should be rigid and its mass should also be as small as practical to further ensure that its resonant frequency is significantly higher than that of the optical microscope 30. According to one embodiment of the present invention, the sample stage 50 comprises a stainless steel disk of 5 cm diameter and 0.3 cm thickness. Again, it is contemplated that other materials and dimensional combinations will also be suitable for practicing the present invention.

To enable fine adjustment of the position of the sample stage 50, each of the suspension members 64 may comprise a partially or fully threaded elongate rigid shaft or screw. Each shaft or screw 64 supports a portion of the sample stage 50 through the attractive force generated by a magnetic ball 65 secured to its distal end 62. Each adjustable rigid shaft or screw 64 is engaged either in a threaded bore in the microscope coupling 40 or in a threaded bore formed in an additional member supported by the microscope coupling 40.

Preferably, the microscope coupling 40 includes or is mounted to a slide-mounted movable stage assembly 70. The movable stage assembly 70 is arranged to permit movement of the sample stage 50 and the sample stage support 60 relative to the optical microscope 30 and chassis 15. As is illustrated in FIG. 2, the range of movement of the slide-mounted stage assembly 70 is preferably sufficient to enable movement of the sample stage 50 away from the optical microscope 30 and chassis 15 to permit removal and replacement of the sample or the entire sample stage 50 independent of any interference by the optical microscope 30 or the chassis 15. Stated differently, where the optical microscope 30, the scanning probe microscope 20, and the microscope coupling 40 define a sample stage enclosure, the movable stage assembly 70 preferably defines a range of movement sufficient to enable movement of the sample stage 50 outside of the sample stage enclosure.

In the illustrated embodiment, referring to FIGS. 2 and 4, it is noted that the microscope coupling 40 is mounted to the movable stage assembly 70 about a circumferential mounting zone 42 defined in the coupling 40. The movable stage assembly 70 may also form an integral part of the microscope coupling 40. It is contemplated that the movable stage assembly 70 of the present invention will have utility and advantages outside of the context of combined scanning probe and optical microscopes. For example, the movable stage assembly 70 may be useful in the context of any scanning probe microscope application where it would otherwise be difficult to replace a sample under analysis.

Referring now to FIGS. 4 and 5, it is noted that the microscope 10 of the present invention may also be provided with a specialized solenoid driven cantilever assembly 80. Generally, the cantilever assembly 80 comprises a cantilever unit 22, a probe tip 25, and a solenoid unit 82 positioned above the cantilever unit 22. The solenoid unit 82 comprises a magnetic core 84 and a solenoid winding 86 and is configured to cause movement of the free end 26 of the flexible cantilever 24. Applicants note that, for the purposes of defining and describing the present invention, the manner in which the solenoid unit is employed to impart movement to the flexible cantilever 24 is not the subject of the present invention and may be gleaned from related teachings present in any one of a number of U.S. Patents, including those identified above.

The solenoid unit 82 of the present invention is particularly advantageous because it is positioned above the cantilever unit 22, outside of the optical path 90 defined between a laser source 92 and detector 94 used to monitor cantilever movement. Further, the cantilever unit 22 may be positioned directly adjacent to, mechanically coupled to, or secured proximately or directly to the magnetic core 84 of the solenoid unit 82, optimizing the effect of the magnetic field generated by the solenoid unit 82 on the flexible cantilever 24.

As is illustrated in FIG. 5, the magnetic core 84 defines an extended portion 88 outside of the solenoid winding 82 and the cantilever unit 22 is mechanically coupled or secured to the extended portion 88 of the magnetic core 84. The cantilever unit 22 may further comprise a cantilever support chip 23 to which the confined end 28 of the flexible cantilever 24 is secured. The cantilever support chip 23 may, in turn, be secured to the magnetic core 84 of the solenoid unit 82. Preferably, the cantilever unit 22 is releasably secured to the magnetic core 84 by means of a spring-loaded strap 85 and a releasable clip 87. It is contemplated that a variety of arrangements may be provided to position the cantilever unit 22 proximate to the magnetic core.

Referring further to FIG. 5, the solenoid driven cantilever assembly 80 may further comprise an optically transparent element 81 arranged to pass light to an upper side of the cantilever unit 22 proximate to the free end of the flexible cantilever 24. As is illustrated in FIG. 5, the solenoid winding 86 is wound about portions of the magnetic core 84 and the optically transparent element 81, which may be a glass block, a hollow tube, a lens element, etc.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A combined scanning probe and optical microscope comprising:

a sample stage defining an upper surface and a lower surface;

a scanning probe microscope configured to examine a surface of a sample supported by said upper surface of said sample stage from above said sample stage;

an optical microscope configured to examine a sample supported by said upper surface of said sample stage from below said sample stage;

a microscope coupling mechanically coupling elements of said scanning probe microscope to elements of said optical microscope; and a sample stage support configured to isolate said sample stage from said optical microscope, wherein said sample stage, said scanning probe microscope, and said sample stage support define relatively high frequency mechanical resonances, said optical microscope defines relatively low frequency mechanical resonances, and said microscope coupling, said sample stage, and said sample stage support are arranged to inhibit differential motion between said sample stage and said scanning probe microscope in the event of low frequency vibrations in said optical microscope.

2. A combined scanning probe and optical microscope as claimed in claim 1 wherein said combined scanning probe and optical microscope is designed such that a critical path coupling low frequency vibrations generated in said optical microscope to a sample supported by said sample stage runs from said optical microscope, through said microscope coupling, said sample stage support, and, finally, to said sample stage.

3. A combined scanning probe and optical microscope as claimed in claim 2 wherein said sample stage support and said sample stage are designed such that said critical path is not conducive to low frequency vibrational coupling.

4. A combined scanning probe and optical microscope as claimed in claim 1 wherein said scanning probe microscope, said optical microscope, and said microscope coupling define a microscope chassis and wherein said sample stage support is configured to function as the sole significant source of vibro-mechanical coupling between said sample stage and said microscope chassis.

5. A combined scanning probe and optical microscope as claimed in claim 1 wherein said sample stage support includes a plurality of suspension members extending from said microscope coupling and each of said suspension members defines a distal end configured to support said sample stage.

6. A combined scanning probe and optical microscope as claimed in claim 5 wherein each of said suspension members comprises a rigid shaft configured to define a relatively high frequency bending moment.

7. A combined scanning probe and optical microscope as claimed in claim 5 wherein each of said plurality of suspension members comprises an adjustable rigid screw and a magnetic ball secured to a distal end of said screw.

8. A combined scanning probe and optical microscope as claimed in claim 7 wherein said adjustable rigid screw is engaged in a threaded bore in said microscope coupling.

9. A combined scanning probe and optical microscope as claimed in claim 1 wherein said microscope coupling includes a movable stage assembly and wherein said movable stage assembly is arranged to permit controlled movement of said sample stage and said sample stage support relative to said optical microscope.

10. A combined scanning probe and optical microscope as claimed in claim 1 wherein said microscope coupling is mounted to a movable stage assembly and wherein said movable stage assembly is arranged to permit movement of said sample stage and said sample stage support relative to said optical microscope.

11. A combined scanning probe and optical microscope as claimed in claim 10 wherein said movable stage assembly comprises a slide-mounted stage assembly arranged to permit slidable movement of said sample stage and said sample stage support relative to said optical microscope.

12. A combined scanning probe and optical microscope as claimed in claim 10 wherein said movable stage assembly defines a range of movement sufficient to enable movement of said sample stage away from said optical microscope.

13. A combined scanning probe and optical microscope as claimed in claim 10 wherein said movable stage assembly defines a range of movement sufficient to enable removal and replacement of said sample stage independent of said optical microscope.

14. A combined scanning probe and optical microscope as claimed in claim 10 wherein said optical microscope, said scanning probe microscope, and said microscope coupling define a sample stage enclosure and wherein said movable stage assembly defines a range of movement sufficient to enable movement of said sample stage outside of said sample stage enclosure.

15. A combined scanning probe and optical microscope as claimed in claim 1 wherein said scanning probe microscope includes a cantilever unit positioned above said sample stage and comprising:

a flexible cantilever having a free end and a confined end; and a probe tip defined at said free end of said flexible cantilever.

16. A combined scanning probe and optical microscope as claimed in claim 15 further comprising a solenoid unit positioned above said cantilever unit and comprising a magnetic core and a solenoid winding, wherein said solenoid unit is configured to cause movement of said free end of said flexible cantilever.

17. A combined scanning probe and optical microscope as claimed in claim 16 wherein said cantilever unit is mechanically coupled to said magnetic core of said solenoid unit.

18. A combined scanning probe and optical microscope as claimed in claim 16 wherein said cantilever unit is secured proximate to said magnetic core of said solenoid unit.

19. A combined scanning probe and optical microscope as claimed in claim 16 wherein said cantilever unit is secured to said magnetic core of said solenoid unit.

20. A combined scanning probe and optical microscope as claimed in claim 16 wherein said magnetic core defines an extended portion outside of said solenoid winding and wherein said cantilever unit is mechanically coupled to said extended portion of said magnetic core.

21. A combined scanning probe and optical microscope as claimed in claim 16 wherein said solenoid driven cantilever assembly further comprises an optically transparent element arranged to pass light to an upper side of said cantilever unit and wherein said magnetic core and said solenoid winding are positioned above said cantilever unit.

22. A combined scanning probe and optical microscope as claimed in claim 16 wherein said solenoid driven cantilever assembly further comprises an optically transparent element arranged to pass light to said free end of said flexible cantilever.

23. A combined scanning probe and optical microscope as claimed in claim 22 wherein said solenoid winding is wound about portions of said optically transparent element and said magnetic core.

24. A combined scanning probe and optical microscope as claimed in claim 22 wherein said optically transparent element is a glass block or a hollow tube.

25. A combined scanning probe and optical microscope as claimed in claim 16 wherein:

said cantilever unit further comprises a cantilever support chip; and said cantilever support chip is secured to said magnetic core of said solenoid unit.

26. A combined scanning probe and optical microscope as claimed in claim 16 wherein said cantilever unit is releasably secured to said magnetic core.

27. A combined scanning probe and optical microscope as claimed in claim 26 wherein said cantilever unit is secured to said magnetic core by means of a spring-loaded strap.

28. A combined scanning probe and optical microscope as claimed in claim 26 wherein said cantilever unit is secured to said magnetic core by means of a releasable clip.

29. A scanning probe microscope comprising:
a sample stage;
a scanning probe microscope supported by a microscope chassis and configured to examine a surface of a sample supported by said sample stage;
a microscope coupling supporting elements of said scanning probe microscope;
a sample stage support configured to suspend said sample stage from said microscope coupling; and
a slide-mounted stage assembly arranged to permit slidable movement of said sample stage and said sample stage support relative to said microscope chassis.

30. A scanning probe microscope as claimed in claim 29 wherein said slide-mounted stage assembly is further arranged to permit slidable movement of said scanning probe microscope relative to said microscope coupling.

31. A scanning probe microscope as claimed in claim 29 wherein said slide-mounted stage assembly defines a range of movement sufficient to enable movement of said sample stage away from said microscope coupling.

32. A scanning probe microscope as claimed in claim 29 wherein said slide-mounted stage assembly defines a range of movement sufficient to enable removal and replacement of said sample stage independent of said microscope coupling.

33. A scanning probe microscope as claimed in claim 29 wherein said scanning probe microscope and said microscope coupling define portions of a sample stage enclosure and wherein said slide-mounted stage assembly defines a range of movement sufficient to enable movement of said sample stage outside of said sample stage enclosure.

34. A scanning probe microscope comprising a sample stage, a scanning probe microscope configured to examine a surface of a sample supported by said sample stage, a microscope coupling, and a sample stage support configured to suspend said sample stage from said microscope coupling, wherein said scanning probe microscope includes a solenoid driven cantilever assembly comprising:
a cantilever unit positioned above said sample stage and comprising a flexible cantilever having a free end and a confined end;
a probe tip defined at said free end of said flexible cantilever; and
a solenoid unit positioned above said cantilever unit and comprising a magnetic core and a solenoid winding, wherein said cantilever unit is secured to said solenoid unit and said solenoid unit is configured to cause movement of said free end of said flexible cantilever.

35. A scanning probe microscope as claimed in claim 34 wherein said cantilever unit is mechanically coupled to said magnetic core of said solenoid unit.

36. A scanning probe microscope as claimed in claim 34 wherein said cantilever unit is secured proximate to said magnetic core of said solenoid unit.

37. A scanning probe microscope as claimed in claim 34 wherein said cantilever unit is secured to said magnetic core of said solenoid unit.

38. A scanning probe microscope as claimed in claim 34 wherein said magnetic core defines an extended portion outside of said solenoid winding and wherein said cantilever unit is mechanically coupled to said extended portion of said magnetic core.

39. A scanning probe microscope as claimed in claim 34 wherein said solenoid driven cantilever assembly further comprises an optically transparent element arranged to pass light to an upper side of said cantilever unit and wherein said magnetic core and said solenoid winding are positioned above said cantilever unit.

40. A scanning probe microscope as claimed in claim 34 wherein said solenoid driven cantilever assembly further comprises an optically transparent element arranged to pass light to said free end of said flexible cantilever.

41. A scanning probe microscope as claimed in claim 40 wherein said solenoid winding is wound about portions of said optically transparent element and said magnetic core.

42. A scanning probe microscope as claimed in claim 40 wherein:
said cantilever unit further comprises a cantilever support chip; and
said cantilever support chip is secured to said magnetic core of said solenoid unit.

43. A scanning probe microscope as claimed in claim 40 wherein said cantilever unit is releasably secured to said magnetic core.

44. A solenoid driven cantilever assembly comprising:
a cantilever unit comprising a flexible cantilever having a free end and a confined end;
a probe tip defined at said free end of said flexible cantilever, said probe tip defining an apex on a lower side of said cantilever unit; and
a solenoid unit positioned above said cantilever unit and comprising a magnetic core and a solenoid winding, wherein said cantilever unit is secured to said solenoid unit and said solenoid unit is configured to cause movement of said free end of said flexible cantilever.

45. A solenoid driven cantilever assembly as claimed in claim 44 wherein said cantilever unit is mechanically coupled to said magnetic core of said solenoid unit.

46. A solenoid driven cantilever assembly as claimed in claim 44 wherein said cantilever unit is secured proximate to said magnetic core of said solenoid unit.

47. A solenoid driven cantilever assembly as claimed in claim 44 wherein said cantilever unit is secured to said magnetic core of said solenoid unit.

48. A solenoid driven cantilever assembly as claimed in claim 44 wherein said magnetic core defines an extended portion outside of said solenoid winding and wherein said cantilever unit is mechanically coupled to said extended portion of said magnetic core.

49. A solenoid driven cantilever assembly as claimed in claim 44 wherein said solenoid driven cantilever assembly further comprises an optically transparent element arranged to pass light to an upper side of said cantilever unit and wherein said magnetic core and said solenoid winding are positioned above said cantilever unit.

50. A solenoid driven cantilever assembly as claimed in claim 44 wherein said solenoid driven cantilever assembly further comprises an optically transparent element arranged to pass light to said free end of said flexible cantilever.

51. A solenoid driven cantilever assembly as claimed in claim 50 wherein said solenoid winding is wound about portions of said optically transparent element and said magnetic core.

52. A solenoid driven cantilever assembly as claimed in claim 44 wherein:
said cantilever unit further comprises a cantilever support chip; and
said cantilever support chip is secured to said magnetic core of said solenoid unit.

53. A solenoid driven cantilever assembly as claimed in claim 44 wherein said cantilever unit is releasably secured to said magnetic core.

54. A scanning probe microscope comprising:

a sample stage;

a scanning probe microscope supported by a microscope chassis and configured to examine a surface of a sample supported by said sample stage;

a microscope coupling supporting elements of said scanning probe microscope;

a sample stage support configured to suspend said sample stage from below said microscope coupling while engaged with said coupling; and a slide-mounted stage assembly arranged to permit slidable movement of said sample stage and said sample stage support relative to said microscope chassis.

* * * * *